(12) United States Patent
Mack

(10) Patent No.: US 6,921,092 B2
(45) Date of Patent: Jul. 26, 2005

(54) DRILL CHUCK

(75) Inventor: Hans-Dieter Mack, Sontheim (DE)

(73) Assignee: Rohm GmbH, Sontheim (DE)

(*) Notice: Subject to any disclaimer, the term of this patent is extended or adjusted under 35 U.S.C. 154(b) by 0 days.

(21) Appl. No.: 10/635,772

(22) Filed: Aug. 6, 2003

(65) Prior Publication Data

US 2004/0084856 A1 May 6, 2004

(30) Foreign Application Priority Data

Aug. 17, 2002 (DE) .......................................... 102 37 750

(51) Int. Cl.[7] ............................................. B23B 31/10
(52) U.S. Cl. ............................................. 279/62; 279/902
(58) Field of Search ............................... 279/60, 61, 62, 279/125, 140, 902

(56) References Cited

U.S. PATENT DOCUMENTS

| | | | | | |
|---|---|---|---|---|---|
| 3,948,534 A | * | 4/1976 | Schnizler et al. | ............. | 279/62 |
| 4,116,454 A | * | 9/1978 | Schnizler et al. | ............. | 279/62 |
| 4,423,881 A | * | 1/1984 | Whitehead | .................. | 279/62 |
| 5,145,192 A | | 9/1992 | Rohm | | |
| 5,145,193 A | | 9/1992 | Rohm | | |
| 5,193,824 A | * | 3/1993 | Salpaka | ........................ | 279/60 |
| 5,458,345 A | * | 10/1995 | Amyot | ......................... | 279/62 |
| 5,503,409 A | * | 4/1996 | Rohm | ......................... | 279/62 |
| 5,765,839 A | | 6/1998 | Rohm | | |
| 5,829,761 A | * | 11/1998 | Rohm | ......................... | 279/62 |
| 6,502,836 B1 | * | 1/2003 | Marriott | ..................... | 279/61 |
| 6,540,237 B1 | * | 4/2003 | Temple-Wilson | ............ | 279/62 |

* cited by examiner

Primary Examiner—Derris H. Banks
Assistant Examiner—Michael W. Talbot
(74) Attorney, Agent, or Firm—Herbert Dubno; Andrew Wilford

(57) ABSTRACT

A drill chuck has a chuck body centered on and adapt d to be rotated about a longitudinal axis and unitarily formed with a plurality of forwardly open angled guides angularly spaced about the axis and with a rim, respective jaws displaceable along the guides in the chuck body and each formed with a row of teeth, and a tightening sleeve rotatably surrounding the body. A threaded ring rotatable on the body about the axis within the tightening sleeve is fixed to the sleeve and formed with a screwthread meshing with the teeth of the jaws so that rotation of the ring in one direction moves the jaws radially together and opposite rotation moves them radially apart. This threaded ring is formed with a radially outwardly open groove covered by the sleeve. In addition the tightening sleeve has an inwardly projecting welt engaged in the groove.

9 Claims, 4 Drawing Sheets

US 6,921,092 B2

DRILL CHUCK

FIELD OF THE INVENTION

The present invention relates to a chuck. More particularly this invention concerns a chuck for a hammer drill.

BACKGROUND OF THE INVENTION

A drill chuck has as described in U.S. Pat. Nos. 5,145,192 and 5,145,193 a chuck body centered on and adapted to be rotated about a longitudinal axis and unitarily formed with a plurality of forwardly open angled guides angularly spaced about the axis and an axially forwardly directed shoulder. Respective jaws displaceable along the guides in the chuck body are each formed with a row of teeth and a tightening sleeve rotatably surrounds the body and has an axially rearwardly directed shoulder. An inner ring rotatable on the body about the axis is formed internally with a screwthread meshing with the teeth of the jaws so that rotation of the inner ring in one direction moves the jaws radially together and opposite rotation moves them radially apart. This inner ring bears axially forward on the shoulder of the sleeve and axially backward on the shoulder of the body. Interengaging formations rotationally couple the inner ring to the sleeve and a retaining element axially fixed on the chuck body forward of the inner ring bears axially backward on the sleeve. With the system of this prior invention the chuck body has axially rearward of the interengaging formations a predetermined outside diameter and the sleeve has axially rearward of the interengaging formations a predetermined inside diameter greater than the outside diameter of the body. The ring has a predetermined outside diameter smaller than the inside diameter of the sleeve so that the ring can be fitted axially forward into the sleeve and the sleeve and ring together can be fitted axially backward over the body.

Such a chuck with a one-piece threaded ring is assembled by slipping the ring over the chuck body from the rear. Once in place it bears forwardly on a shoulder of the chuck body and rearwardly, normally via a roller bearing, on a snap ring set in the chuck body. Then the tightening sleeve is attached to th threaded ring, often via a fairly complex mechanical connection. It is critical that the tightening sleeve be able to transmit considerable torque in both directions to the threaded ring. Failure of this connection makes the chuck unusable.

OBJECTS OF THE INVENTION

It is therefore an object of the present invention to provide an improved drill chuck.

Another object is the provision of such an improved drill chuck which overcomes the above-given disadvantages, that is which has an extremely solid connection between the threaded ring and the tightening sleeve, but where this connection is mad in a very cost-effective manner.

SUMMARY OF THE INVENTION

A drill chuck has according to the invention a chuck body centered on and adapted to be rotated about a longitudinal axis and unitarily formed with a plurality of forwardly open angled guides angularly spaced about the axis and with a rim, respective jaws displaceable along the guides in the chuck body and each formed with a row of teeth, and a tightening sleeve rotatably surrounding the body. A threaded ring rotatable on the body about the axis within the tightening sleeve is fixed to the sleeve and formed with a screwthread meshing with the teeth of the jaws so that rotation of the ring in one direction moves the jaws radially together and opposite rotation moves them radially apart. This threaded ring is formed with a radially outwardly open groove covered by the sleeve. In addition the tightening sleeve has an inwardly projecting welt engaged in the groove.

A chuck of this construction is extremely simple to manufacture. It can be assembled in the usual manner, but the sleeve is fixed to the threaded ring by a simple crimping operation, for instance by running an embossing wheel around the chuck to form the welt pressed into the groove. This simple plastic deformation of the sleeve nonetheless locks the sleeve axially and angular to the threaded ring so that it will be virtually integral therewith.

The groove can be of rectangular section. It has a floor surface and a pair of flank surfaces. One of the surfaces can be formed with transverse ridges engaging the welt. The ridged surface can be the floor surface and/or one or both of the flank surfaces. The ridges extend transversely, that is axially on the floor surface and radially on the flank surfaces, for best angular coupling. It is possible for the flank surfaces to lie in planes perpendicular to the chuck axis, giving the above-mentioned rectangular shape, or to be frustoconical, in which case the groove is of isosceles trapezoidal shape.

According to a further feature of the invention the chuck body has a frustoconical front edge formed with radially extending ridges into which the sleeve is pressed. In this case deformation of the sleeve into the groove serves mainly for axial coupling, and the front-edge teeth serve for angular coupling. Such an arrangement is particularly interesting in a so-called keyless chuck, one that is tightened and loosened wholly by hand without the use of a tool. It is also recommended with a two-part threaded ring, that is on comprised of two semicircular pieces.

The drill chuck further has according to the invention a lock mechanism between the sleeve and the ring. This mechanism prevents unintentional reverse rotation of the tightening sleeve and loosening of the chuck. Such a system as described in U.S. Pat. No. 5,765,839 has two part threaded ring and sleeve, with an outer sleeve of one piece and basically tubular construction holding everything together.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
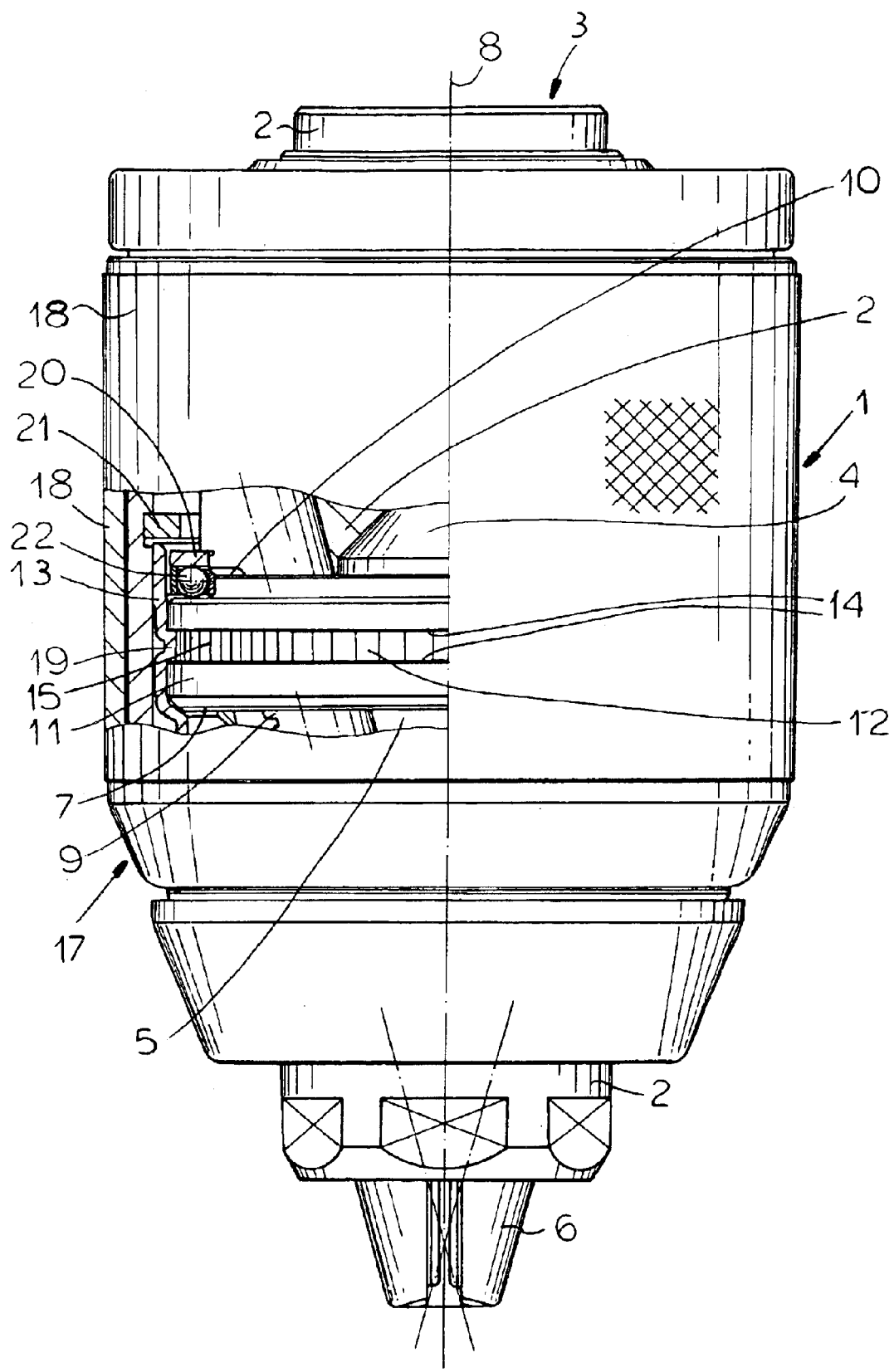
FIGS. 1 through 4 are side views partly in section showing four embodiments of the chuck according to the invention.

As seen in FIG. 1 a chuck 1 according to the invention has a machined steel body 2 centered on an axis 8 and formed with an axially rearwardly open threaded bore 3 adapted to receive a spindle of a power unit, an axially forwardly open seat 5 adapted to receive the shank of a tool, and a passage 4 connecting the bore 3 and seat 5 so that, if desired, a hammer rod can act directly on the rear end of a tool shank in the seat 5. Three angled guide passages 7 equispaced about the axis 8 open axially forward into the seat 5 and each hold a respective slidable steel jaw 6 having an outer edge formed with a screwthread-like row of teeth 9 meshing with an internal screwthread of a one-piece threaded tightening ring 11 connected to an inner tightening sleeve 13 coaxially surrounding the chuck body 2. Here the ring 11 is made of two semicircular parts set in a radially outwardly open groove 10 of the body 2.

According to the invention as shown in FIG. 1 the threaded ring 11 is formed with a circumferential, radially outwardly open, and annularly continuous groove 12 having a radially outwardly directed cylindrical floor surface 1 and a pair of sides surfaces or flanks 14. The floor 16 is formed with radially outwardly projecting and axially extending sharp-edge ridges 15. The tightening sleeve 13 is formed with a radially inwardly projecting welt or ridge 19 that fits complementarily into the groove 12 and that is, in fact, pressed so tightly therein as to integrally lock the sleeve 13 to the ring 11 both against relative angular and axial movement relative thereto.

Figure 2:
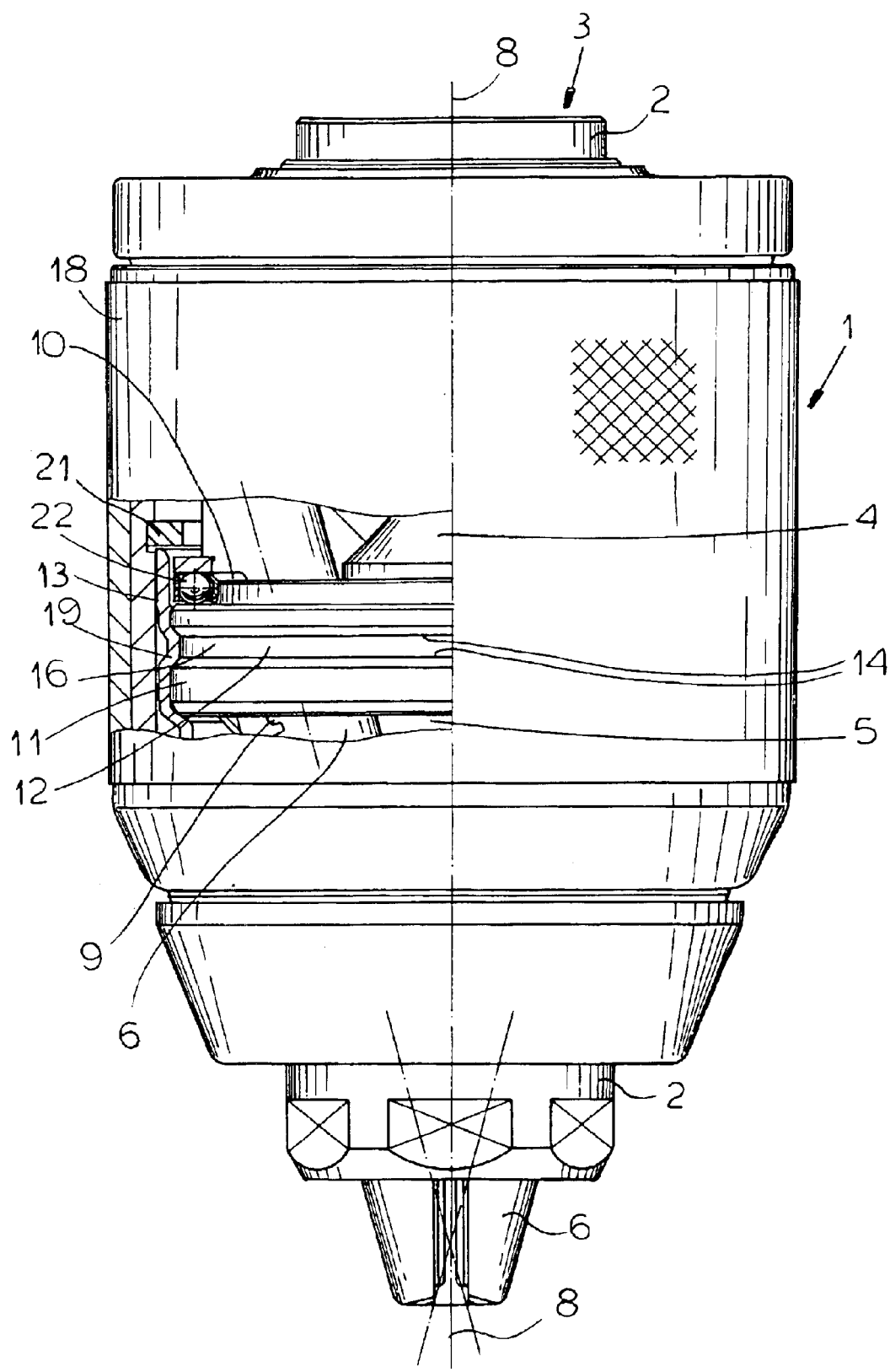
Figure 3:
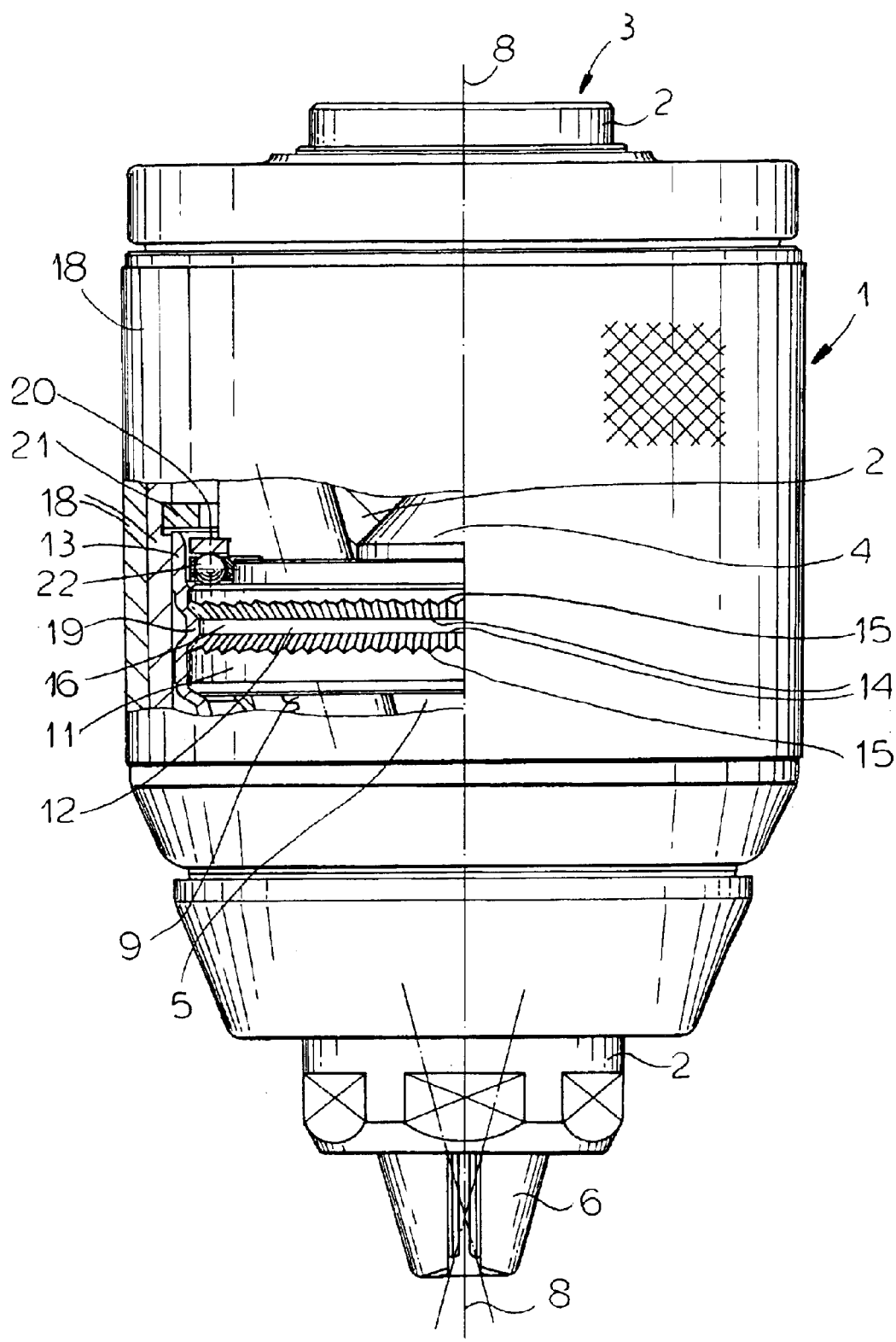
Figure 4:
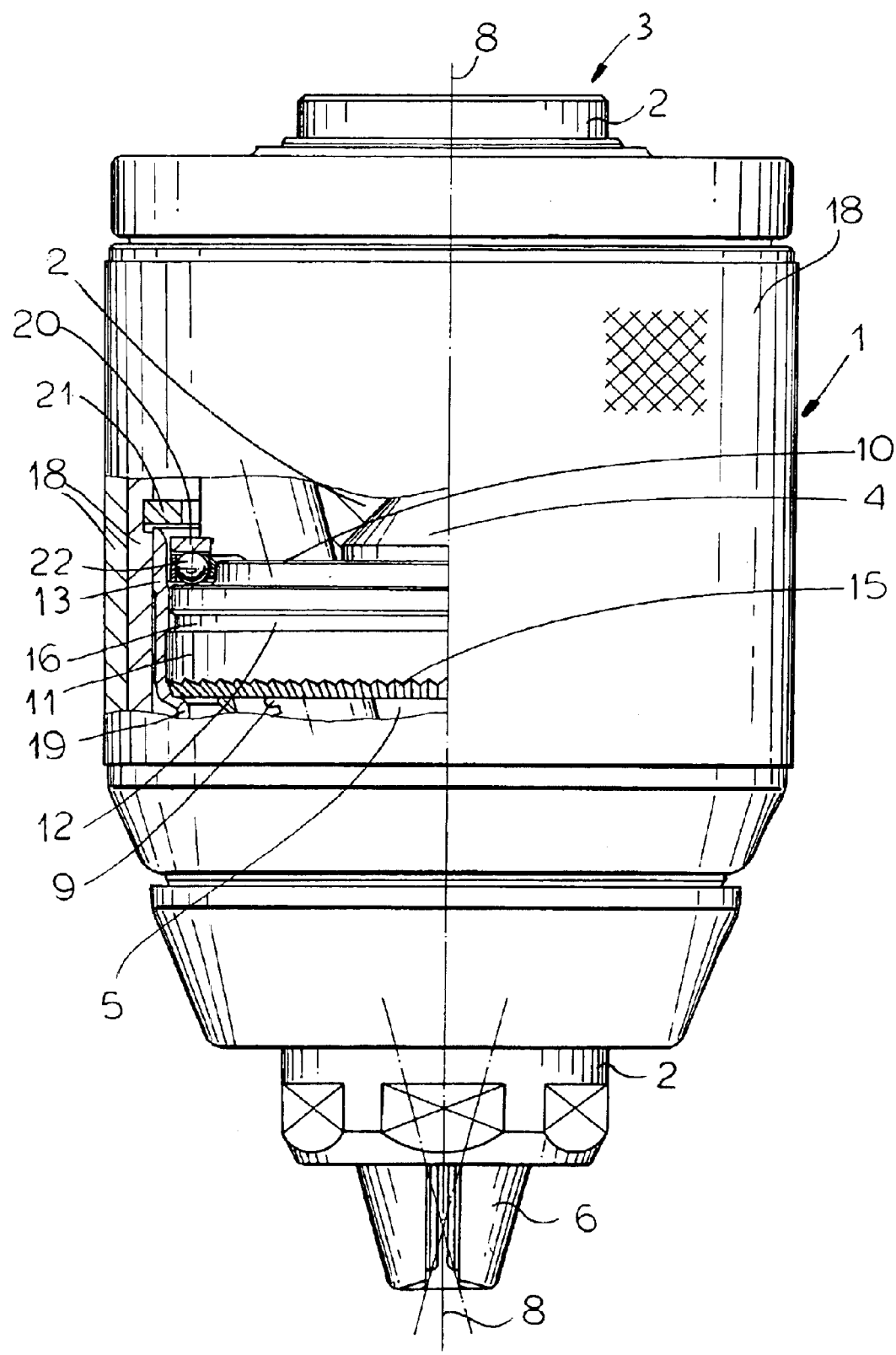

Whereas in FIG. 1, the groove 12 is of rectangular section, with the two flanks 14 lying in respective planes perpendicular to the axis, in FIG. 2 the two flanks 14 are frustoconical, flaring away from each other, and both the flanks 14 are smooth. In FIG. 3 the flanks 14 are formed with ridges 15 that bite into the welt 19 and improve angular coupling between the sleeve 13 and ring 11, and the floor 16 is smooth. Only one of the flanks 14 could have the ridges 15. In FIG. 4 the groove 12 is formed centrally in the ring 11, but the front end is formed with a frustoconical surface having the ridges 15 into which the sleeve 13 is pressed.

The chuck 1 according to the invention has a locking mechanism 17 connected between an outer tightening sleeve 18 and the inner tightening sleeve 13. The structure of such a mechanism is described in detail in U.S. Pat. No. 5,765,839 of Rohm. It has a latching member carried on the sleeve 13, which is axially and angularly coupled as described above to the threaded ring 11.

A spring steel washer 20 has an inner periphery bearing axially rearward on an axially forwardly facing shoulder of the body 2 and bears axially forward on balls 22 riding on a rear face of the ring 11. The ring 11 bears axially forward on an axially rearwardly directed shoulder of the sleeve 18. The washer 20 can be deflected backward when pushed by the balls 22 which engage the washer 20 radially outward of the shoulder.

Another spring washer or snap ring 21 has its outer periphery set in a groove of a liner of the sleeve 18 and engageable if necessary with a rear end of the sleeve 13, further inhibiting rearward shifting of the sleeve 18, which as described above is locked axially to the ring 11. The front end of the sleeve 18 comes radially inward somewhat so that it also bears at its front end on the chuck body 2.

I claim:

1. A drill chuck comprising:
 a chuck body centered on and adapted to be rotated about a longitudinal axis and unitarily formed with a plurality of forwardly open angled guides angularly spaced about the axis and with a rim;
 respective jaws displaceable along the guides in the chuck body and each formed with a row of teeth;
 a metallic tightening sleeve rotatably surrounding the body; and
 a metallic threaded ring rotatable on the body about the axis within the tightening sleeve and formed with a screwthread meshing with the teeth of the jaws, whereby rotation of the ring in one direction moves the jaws radially together and opposite rotation moves them radially apart, the ring being formed with a radially outwardly open groove covered by the sleeve and being formed in the groove with transverse ridges, the sleeve being unitarily formed with an invardly projecting welt plastically deformed into the ridges in the groove, whereby the welt couples the ring to the sleeve.

2. The drill chuck defined in claim 1 wherein the groove is of rectangular section.

3. The drill chuck defined in claim 1 wherein the groove has an annular floor surface and a pair of annular flank surfaces, at least one of the surfaces being formed with the transverse ridges engaging the welt.

4. The drill chuck defined in claim 3 wherein the floor surface is formed with the ridges.

5. The drill chuck defined in claim 3 wherein at least one of the flank surfaces is formed with the ridges.

6. The drill chuck defined in claim 3 wherein both of the flank surfaces are formed with the ridges.

7. The drill chuck defined in claim 1 wherein the ring has a front edge formed with radially extending ridges into which the sleeve is also pressed.

8. The drill chuck defined in claim 1, further comprising a lock mechanism between the sleeve and the ring.

9. A drill chuck comprising:
 a chuck body centered on and adapted to be rotated about a longitudinal axis and unitarily formed with a plurality of forwardly open angled guides angularly spaced about the axis and with a rim;
 respective jaws displaceable alone the guides in the chuck body and each formed with a row of teeth;
 a tightening sleeve rotatably surrounding the body; and
 a threaded ring rotatable on the body about the axis within the tightening sleeve, fixed to the sleeve, and formed with a screwthread meshing with the teeth of the jaws, whereby rotation of the ring in one direction moves the jaws radially together and opposite rotation moves them radially apart, the ring being formed with a radially outwardly open groove covered by the sleeve, the groove having a radially outwardly directed cylindrical floor surface and a pair of outwardly flaring frustoconical flank surfaces to each axial side of the floor surface.

* * * * *